Patented Dec. 9, 1952

2,621,187

UNITED STATES PATENT OFFICE 2,621,187

SYNTHESIS OF TRYPTOPHANE AND DERIVATIVES THEREOF

Reuben G. Jones and Edmund C. Kornfeld, Indianapolis, Ind., assignors to Eli Lilly and Company, Indianapolis, Ind., a corporation of Indiana No Drawing. Application October 6, 1950, Serial No. 188,863

5 Claims. (Cl. 260—319)

This invention relates to a novel synthesis of tryptophane and derivatives thereof.

The synthesis provided by this invention comprises the reactions represented by the following chemical equations in which R represents a lower alkyl radical; $R_1$ represents hydrogen or a lower alkyl radical; $R_2$ represents hydrogen, lower alkyl, lower alkoxy, halogen or the like at positions 4, 5, 6 and 7 of the indole nucleus; Ac represents an acyl radical of a lower aliphatic carboxylic acid or a monocyclic carboxylic acid; and X represents one equivalent of an anion.

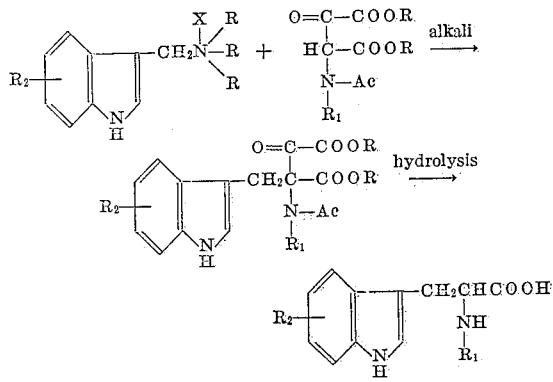

From the above equations it will be seen that the synthesis of this invention comprises reacting a skatyl compound, specifically a skatyl quaternary ammonium salt, with an acylaminooxalacetic acid ester in an alkaline medium (preferably mildly alkaline) to obtain a skatyl-acylaminooxalacetic acid ester which by a conventional hydrolysis is converted into tryptophane or a derivative thereof.

The synthesis employs readily available starting materials; is simple and versatile; is productive of good yields; and, with the exception of the hydrolysis step, can be carried out in a single reaction vessel.

The acylaminooxalacetic esters used as starting materials in the synthesis illustrated above, are readily prepared by condensing an acylglycine ester with an oxalic acid ester, the condensation being carried out under alkaline conditions. Condensations of this general type have long been employed and many suitable reaction procedures are known to the art. The alkali employed in this condensation serves to furnish the alkaline medium required for the subsequent reaction with the skatyl ammonium salt.

The skatyl ammonium salts also used as starting materials are readily obtainable from known or available skatyl compounds, e. g. gramine, by alkylation procedures known to the art. The skatyl ammonium salts need not be prepared from the skatyl compounds by a separate reaction but can be prepared in the reaction mixture in the course of effecting the condensation with the acylaminooxalacetic ester. Alkylation under such conditions is most readily obtained by using an alkylating agent such as a dialkyl sulfate, an alkyl iodide or the like.

To illustrate in a general way the synthesis of this invention, a description of the preparation of tryptophane is given below.

N-acetylglycine ethyl ester and ethyl oxalate are condensed by means of sodium alcoholate and the condensation product which is the sodium deriative of an acetylaminooxalacetic ester, is reacted in solution with a skatyl compound (in this instance, gramine), and an alkylating agent, e. g. dimethyl sulfate. Reaction occurs spontaneously, and when complete the skatyl-oxalyl compound is isolated as by evaporating the solvent from the reaction mixture, and separating the skatyl-oxalyl compound from the inorganic constituents of the residue by extraction with an organic solvent in which the skatyl-oxalyl compound is soluble. For such purposes numerous solvents including benzene, chloroform, carbon tetrachloride and the like, are satisfactory and many others will suggest themselves to those skilled in the art. The organic solvent is removed from the skatyl-oxalyl compound by distillation or evaporation, and the residual skatyl-oxalyl compound is hydrolysed by refluxing with aqueous alkali to yield tryptophane, and the tryptophane is isolated and purified by conventional methods.

It will be apparent to those skilled in the art that numerous variations can be made in the above-described process and that a wide range of starting materials can be employed to provide directly a variety of tryptophane derivatives.

This invention is further illustrated by the following examples.

EXAMPLE 1

*Preparation of tryptophane*

6.0 g. of powdered sodium suspended in 100 ml. of dry ether are treated with 18 ml. of absolute ethanol. After most of the sodium has reacted, 37 g. of ethyl oxalate are added slowly. To the resulting homogenous mixture are added very slowly 36.3 g. of N-acetylglycine ethyl ester dissolved in 75 ml. of dry ether. The mixture is stirred for a few hours and allowed to stand at room temperature for about 8 hours. The ether is then evaporated and the residue is dissolved in 250 ml. of ethanol. While stirring the reaction mixture, 43.6 g. of gramine are added, and 63 g. of dimethyl sulfate are added dropwise over a period of 15 minutes. During addition of the dimethyl sulfate the temperature of the reaction mixture rises to about 70° C. The reaction mixture is stirred for several hours and allowed to stand for an additional several hours. The mixture is then concentrated by evaporation in vacuo, and 300 ml. of chloroform are added. The chloroform layer in which the skatyl-oxalyl intermediate compound dissolves, is washed sequentially with 250 ml. of 4 percent hydrochloric acid solution, 250 ml. of 10 percent sodium carbonate solution, and 200 ml. of water. The chloroform solution is dried over magnesium sulfate and the chloroform removed in vacuo. About 85.5 g. of crude skatyl-oxalyl intermediate is obtained in the form of a thick sirup. The skatyl-oxalyl intermediate is difficult to obtain in pure state because of the ease with which it degrades to a tryptophane derivative, but purification is unnecessary and the intermediate is hydrolyzed as follows:

5 g. of skatyl-oxalyl compound are refluxed with 50 ml. of 10 percent sodium hydroxide solution for 24 hours. The hydrolyzed mixture is filtered and neutralized with 7 ml. of glacial acetic acid. The insoluble material is separated, filtered off and discarded. The filtrate is allowed to stand overnight, whereupon about 1.9 g. of tryptophane (70 percent of theory) separates in crystalline form.

EXAMPLE 2

*Preparation of tryptophane*

Tryptophane is also prepared by the procedure described in Example 1, using 45 g. of ethyl hippurate in place of 36.3 g. of N-acetylglycerine ethyl ester, and 51 g. of 3-(dipropylaminoethyl) indole in place of 43.6 g. of gramine as called for in Example 1.

EXAMPLE 3

*Preparation of amino-N-methyltryptophane*

25 g. of sodium methylate are suspended in 400 ml. of absolute ether, and 58 g. of methyl oxalate dissolved in 150 ml. of ether are added to the suspension. The mixture is stirred, and to it is added slowly a solution of 56.6 g. of N-formylsarcosine methyl ester dissolved in 175 ml. of dry ether. The reaction mixture is allowed to stand for about 24 hours, and the ether is evaporated. The residue consisting of the sodium salt of the oxalyl condensation product is dissolved in 750 ml. of absolute methanol and 75 g. of gramine are added to the solution. The mixture is stirred, and 100 g. of dimethyl sulfate are added dropwise over a period of 10 minutes. During the addition of the dimethyl sulfate the reaction mixture is cooled to maintain the temperature of the mixture at about 30–35° C. The reaction mixture is further stirred for about 2 hours and is allowed to stand for a few hours. The methanol is removed from the reaction mixture by evaporation in vacuo, 1 liter of chloroform is added to the residue, and the chloroform solution is washed sequentially with 500 ml. of water, 500 ml. of 1 N hydrochloric acid and 500 ml. of 2 N sodium carbonate. The solution is dried over magnesium sulfate and the chloroform is evaporated in vacuo leaving a residue of about 44 g. of the skatyl-oxalyl intermediate in the form of a thick sirup.

The skatyl-oxalyl intermediate is hydrolyzed by refluxing it with concentrated barium hydroxide solution. The barium is removed from the solution by treatment with carbon dioxide and sulfuric acid, and the amino-N-methyltryptophane remaining in the solution is isolated by concentrating the solution in vacuo to a small volume whereupon the amino-N-methyltryptophane separates in crystalline form. M. P. 271.5–277.5° C. (dec.).

EXAMPLE 4

*Preparation of 5-methyltryptophane*

5-methyltryptophane is prepared according to the procedure of Example 1 using 1.3 g. of sodium, 7.3 g. of ethyl oxalate, 6.8 g. of N-acetylglycine ethyl ester, 8.9 g. of 5-methylgramine and 12 g. of dimethyl sulfate. The 5-methyltryptophane obtained from the reaction melts at about 264–265° C. (dec.).

EXAMPLE 5

*Preparation of tryptophane*

15.5 g. of N-acetylglycine ethyl ester is oxalated in ether according to the procedure described in Example 1. The ether is removed from the oxalyl compound and replaced with 250 ml. of absolute methanol. 31.6 g. of gramine methiodide are added to the solution and the mixture is stirred for about 28 hours. The alcohol is removed from the reaction mixture in vacuo and the residue comprising the skatyl-oxalyl compound is dissolved in 300 ml. of chloroform, and the chloroform solution is treated according to the procedure described in Example 1. The skatyl-oxalyl condensation product recovered from the chloroform solution is hydrolyzed with sodium hydroxide and the tryptophane is isolated as described in Example 1.

EXAMPLE 6

*Preparation of 6-methoxytryptophane*

6-methoxytryptophane is prepared according to the procedure of Example 1, using 2.5 g. of sodium, 15 g. of ethyl oxalate, 17 g. of N-acetylglycine ethyl ester, 9.5 g. of 6-methoxygramine and 25 g. of dimethyl sulfate. The 6-methoxytryptophane obtained from the reaction after recrystallization melts at about 263–268° C.

The 6-methoxygramine used in the reaction is obtained by the Mannich reaction by reacting 6-methoxyindole with formaldehyde and dimethylamine in accordance with the general procedure described in J. Am. Chem. Soc. 66, 200 (1944).

EXAMPLE 7

*Preparation of 4-chlorotryptophane*

4-chlorotryptophane is prepared according to the procedure of Example 1 using 53 g. of 4-chlorogramine in place of the 43.6 g. of gramine employed in Example 1.

The 4-chlorogramine is obtained from 4-chloroindole according to the procedure described in J. Am. Chem. Soc. 66, 200 (1944).

We claim:

1. A method of synthesizing tryptophane and derivatives thereof which comprises reacting under alkaline conditions a compound represented by the formula

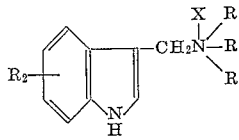

wherein X represents one equivalent of an anion, R represents a lower alkyl radical, and $R_2$ represents a radical of the group consisting of hydrogen, lower alkyl, lower alkoxy, and halogen, with a compound represented by the formula

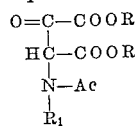

wherein R has the same significance as before, $R_1$ represents a radical of the group consisting of hydrogen and lower alkyl; and Ac represents an acyl radical derived from a member of the group consisting of lower aliphatic carboxylic acids and benzene carboxylic acids; and hydrolizing the resultant reaction product.

2. In a process of synthesizing tryptophane and derivatives thereof, the process step which comprises reacting in an alkaline medium a compound represented by the formula

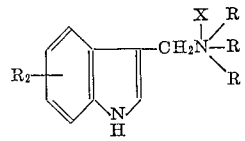

wherein X represents one equivalent of an anion, R represents a lower alkyl radical, and $R_2$ represents a radical of the group consisting of hydrogen, lower alkyl, lower alkoxy, and halogen, with a compound represented by the formula

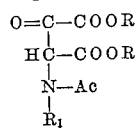

wherein R has the same significance as before, $R_1$ represents a radical of the group consisting of hydrogen and lower alkyl, and Ac represents an acyl radical derived from a member of the group consisting of lower aliphatic carboxylic acids and benzene carboxylic acids.

3. A method of synthesizing tryptophane which comprises reacting under alkaline conditions, a gramine quaternary ammonium salt with a compound represented by the formula

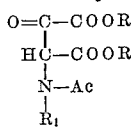

wherein R represents a lower alkyl radical, $R_1$ represents a radical of the group consisting of hydrogen and lower alkyl, and Ac represents an acyl radical derived from a member of the group consisting of lower aliphatic carboxylic acids and benzene carboxylic acids; and hydrolyzing the resultant reaction product.

4. A method of synthesizing tryptophane which comprises reacting gramine methiodide with acetylaminooxalacetic acid ethyl ester under alkaline conditions, and hydrolyzing the resultant reaction product.

5. A method of synthesizing tryptophane which comprises reacting gramine methosulfate with acetylaminooxalacetic acid ethyl ester under alkaline conditions, and hydrolyzing the resultant reaction product.

REUBEN G. JONES.
EDMUND C. KORNFELD.

REFERENCES CITED

The following references are of record in the file of this patent:

UNITED STATES PATENTS

| Number | Name | Date |
|---|---|---|
| 2,447,545 | Snyder et al. | Aug. 24, 1948 |

OTHER REFERENCES

Albertson et al.: Jr. Am. Chem. Soc., vol. 66, p. 500 (1944).